Feb. 21, 1950    C. I. LATHREM    2,498,109
VARIABLE PITCH PROPELLER
Filed Nov. 6, 1944    4 Sheets-Sheet 1

INVENTOR
CHARLES I. LATHREM
BY
Furman Rinehart
ATTORNEY

Feb. 21, 1950

C. I. LATHREM 2,498,109

VARIABLE PITCH PROPELLER

Filed Nov. 6, 1944

INVENTOR
CHARLES I. LATHREM
BY
Furman Rinehart
ATTORNEY

INVENTOR
CHARLES I. LATHREM
BY
Furman Rinehart
ATTORNEY

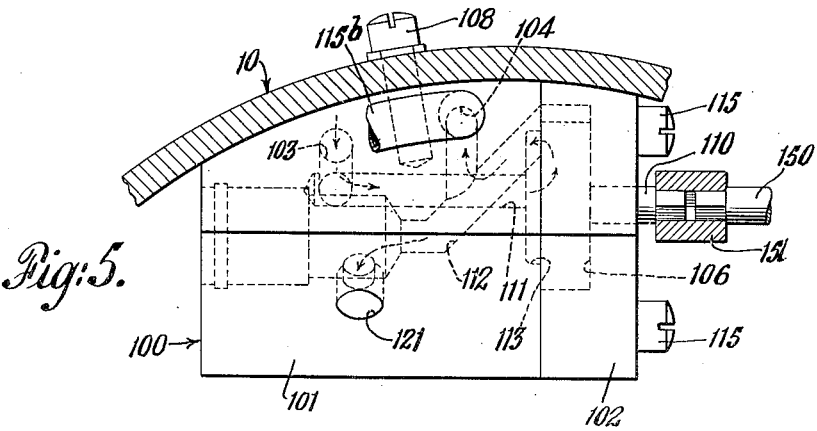

Patented Feb. 21, 1950

2,498,109

UNITED STATES PATENT OFFICE 2,498,109

VARIABLE PITCH PROPELLER

Charles I. Lathrem, Quebec, Quebec, Canada, assignor to Canadian Car and Foundry Company Limited, Montreal, Quebec, Canada, a corporation of Canada Application November 6, 1944, Serial No. 562,083

7 Claims. (Cl. 170—160.32)

This invention relates to airplane propellers and more particularly to that type sometimes called changeable or variable pitch propellers.

The invention provides propellers which may be adjusted to operate at a predetermined fine pitch or to operate at a predetermined course pitch by means of operating mechanism which is self-contained in the propeller hub.

According to one form of device embodying the invention a hollow hub having radially extending hollow arms to support the root ends of the propeller blades for rotation, also serves as a reservoir for hydraulic fluid. A fluid pump is mounted in the hub. By means of this pump, which operates in response to rotation of the propeller, the fluid is caused to act upon an hydraulic motor within the hub. This motor has a piston slidable along a hub insert; the hub insert serving also to mount the propeller on the engine drive shaft. By means of a valve within the hub, but adjustable from without, the fluid pressure from the pump may be routed to force the piston axially in one direction or the other. The axial movement of the piston is translated into blade rotating torque by means of lever mechanism connecting the piston and root ends of the blades. Suitable stops are provided to retain the blades in predetermined fine pitch position when the piston is urged in the corresponding direction and to retain the blades in predetermined course pitch position when the piston is urged in the opposite direction.

Although the novel features which are believed to be characteristic of the invention will be particularly pointed out in the claims appended hereto, the invention itself, as to its objects and advantages, and the manner in which it may be carried out, may be better understood by referring to the following description taken in connection with the accompanying drawings forming a part hereof, in which:

Fig. 5 is a plan view of the pump unit in the hub to larger scale;

Fig. 6 is a view in section of the pump on line 6—6 of Fig. 7;

Fig. 7 is a view in section of the pump on line 7—7 of Fig. 6; and

Fig. 8 is a view in horizontal section of the control valve.

Figure 1:
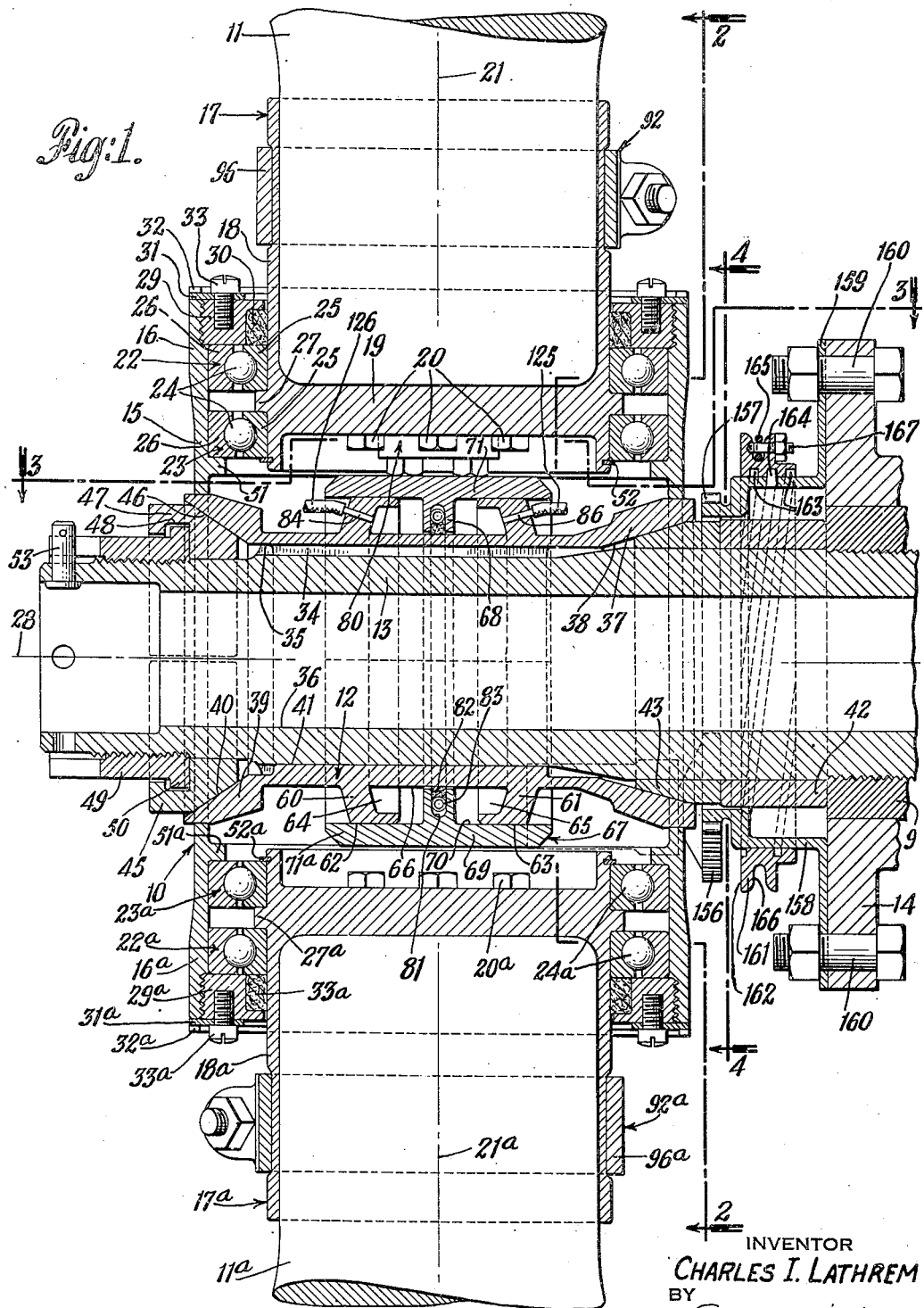
Fig. 1 is a cross-section of the propeller assembly mounted on the drive shaft of an airplane engine on line 1—1 of Fig. 2.

The propeller shown in the drawings comprises, in general, a hub 10, propeller blades 11, 11a and a hollow insert 12 serving to mount the propeller on the engine drive shaft 13. The drive shaft extends through a bracket 14 fixed to the airplane engine.

The hub, designated generally by reference character 10, has a hub barrel 15 of generally cylindrical shape from which extends hollow arms 16 and 16a radially from the hub barrel. Inasmuch as each of arms 16 and 16a and the blade mounting is of similar construction, only one is described; it being apparent that parts indicated by reference characters with sub-letter "a" are similar to those parts having the same reference character without sub-letters.

The root end of propeller blade 11 is mounted in a ferrule 17 having a cylindrical wall portion 18, and a base portion 19 through which extend lag bolts 20 to secure the blade to the ferrule. The ferrule, and hence the blade 11, is mounted for rotation about the blade axis 21.

The ferrule 17 is mounted in bearings 22 and 23 of radial thrust type, each comprising balls 24 mounted in an inner ring race 25 and an outer ring race 26. The inner bearing 23 rests upon an annular flange 51 of the hollow arm 16 and on a split ring 52 on the ferrule 17. An annular flange 27 on the ferrule 17 maintains the bearings 22 and 23 in spaced relation and serves to take the thrust when the propeller is rotated about its axis of rotation 28. A threaded blade retention nut 29 maintains the bearings in place. A packing ring 30 serves to prevent hydraulic fluid, later to be described, from leaking out of the hub. A nut retention plate 31 having radially extending projections registering with slots 32 in the hub arm is secured to hub retention nut 29 by screws 33.

The hollow hub insert 12 is mounted in the hub and secured thereto in suitable manner, as by welding. It is in general of cylindrical shape and has a bore 41 which may be tapered slightly from the rear (that is, the end nearest the engine) toward the front end. Its interior surface has splines 34 and grooves 35 which register with corresponding splines and grooves on the exterior surface of the drive shaft. The drive shaft 13 has a bore 36.

The inner end of hub insert 12 is flared and the flared portion 37 has a tapered interior surface 38. The outer end of the insert also has a flared portion 39 having a tapered interior surface 40 tapering inwardly toward the rear. When the propeller is mounted on the engine drive shaft 13 a spacer ring 42 abuts the shaft nut 9. A rear cone ring 43 abuts the spacer 42, and the interior surface 38 of the insert flared portion 37 engages the exterior tapered surface 44 of the cone ring 43. A split front cone ring 45 fitting around the forward end of the drive shaft 13 has a tapered surface 46 engaging the interior tapered surface 40 of the insert flared portion 39. This split cone ring 45 has an outwardly extending cylindrical wall portion 47 having an annular groove 48.

To secure the propeller to the drive shaft 13 there is provided an internally threaded shaft nut 49, the threads of which engage corresponding external threads on the shaft. An annular flange 50 on the nut 49 fits into groove 48. Hence, when the nut 49 is tightened and adjusted the propeller is made fast to the engine shaft. When the propeller is thus made fast to the shaft, a shaft nut pin 53 extending through registering apertures in the shaft nut and engine shaft prevent the nut from turning on the shaft, thus to maintain the propeller properly secured to the engine drive shaft, notwithstanding vibrational or other forces which may tend to rotate the nut on the shaft.

The exterior cylindrical surface of the hub insert 12 is provided with spaced annular flanges or bosses 60 and 61, the boss 60 for convenience of description being designated as the front boss, and boss 61, as the rear boss. At their outer peripheries these annular bosses have machined or smooth surfaces 62 and 63. Each boss on the inside is hollowed out to provide in effect annular spaces 64 and 65. The peripheral exterior surface 66 of the insert between the spaced bosses 60 and 61 is also machined or smooth. A split ring piston, designated generally by reference character 67, comprises two complementary half sections each of similar construction. When assembled on the insert, the piston may be said to comprise an annular piston which is an inwardly extending portion 68 within a sleeve 69. The annular or ring piston 68 engages the exterior surface 66 of the insert and the sleeve portion 69 of piston 67 has an interior surface 70 which is machined or smooth and engages the peripheral surfaces 62 and 63 of the annular bosses 60 and 61. The piston 67 is slidable coaxially along the insert 12.

Figure 2:
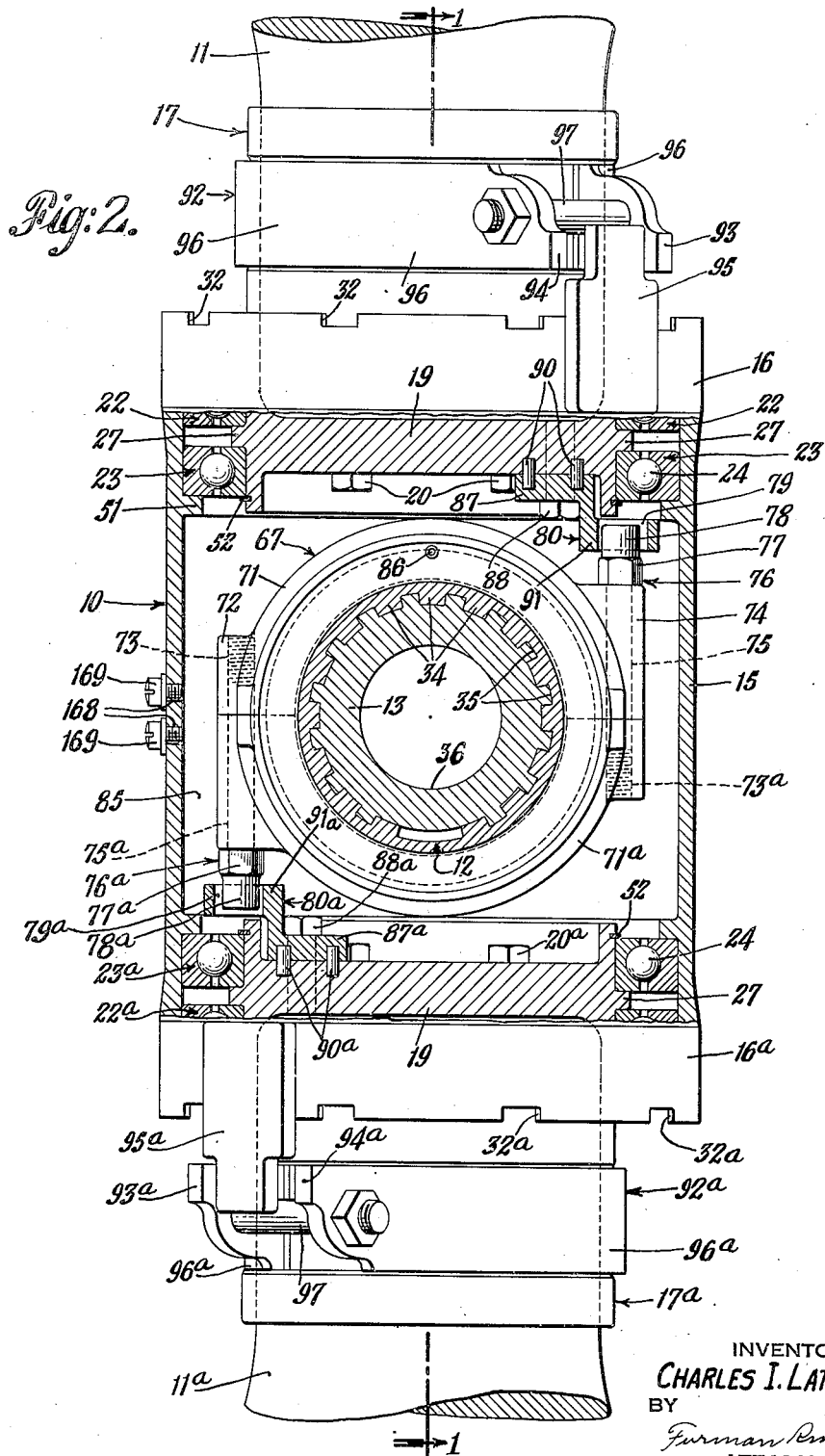
Fig. 2 is a view of the propeller on line 2—2 of Fig. 1.

For convenience of assembly, the piston is made up of two complementary half sections 71 and 71a (see Fig. 2). Since both are similar in construction only one is described. Half section 71 has a lug 72 having a bore 73 which is internally threaded and has, on the opposite side, a lug 74 having an internal bore 75. Half section 71a is similar and has corresponding but complementary bosses and bores. When fitted together in complementary fashion around the insert with the sleeve 69 of the piston 67 engaging the outer surfaces of the annular bosses 60 and 61, the bore 73 registers with bore 75a and bore 75 with bore 73a. Pins 76 and 76a each having a threaded end, a nut portion and also a projecting slot-engaging portion, secure the two half sections 71 and 71a together. As shown in Fig. 2 pin 76 is externally threaded at one end to engage the threads of lug 73a. An integral nut 77 provides a convenient means to tighten the pin. The outer end of the pin has a slot-engaging portion 78 disposed within the slot 79 of lever 80, described in further detail hereinafter. Pin 76a is of similar construction and corresponding parts are designated by the same reference characters with the sub-letter "a."

The annular piston portion 68, which may be referred to for convenience of description as a ring piston, comprising the two half sections, is provided with an annular groove 81 to accommodate a packing ring 82. The packing ring may be held snugly against the cylindrical surface 66 by means of a helical spring 83 within the groove and extending around the packing ring.

Boss 60 is provided with a port 84 connecting with the interior annular space 64 and boss 61 is provided with a port 86 connecting with the interior of annular space 65. As described in further detail hereinafter, hydraulic fluid under pressure may be routed through the ports 84 and 86 to move the ring piston 68, coaxially in either direction between the bosses 60 and 61.

From the foregoing description it will be seen that the piston sleeve 69 with ring piston 68 together with exterior surface 66 of the insert and the annular bosses 60 and 61 provide a double acting hydraulic motor adapted to operate the piston 67 in either direction. The motor may be operated by hydraulic pressure as described hereinafter.

Figure 3:
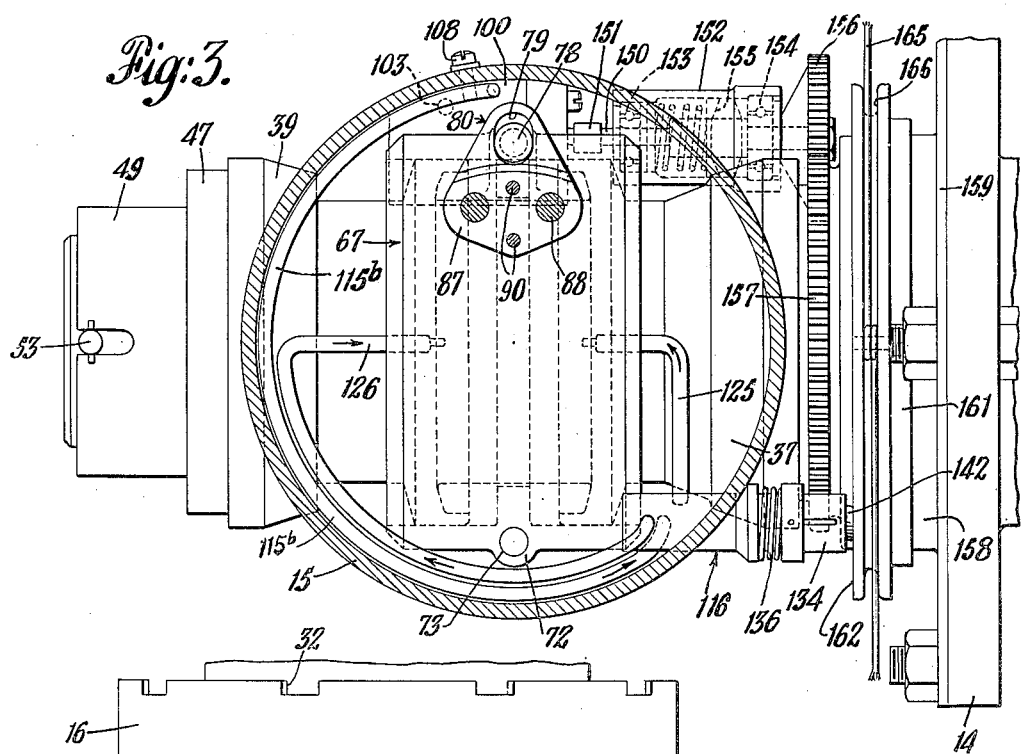
Fig. 3 is a view in section on line 3—3 of Fig. 1.
Figure 4:
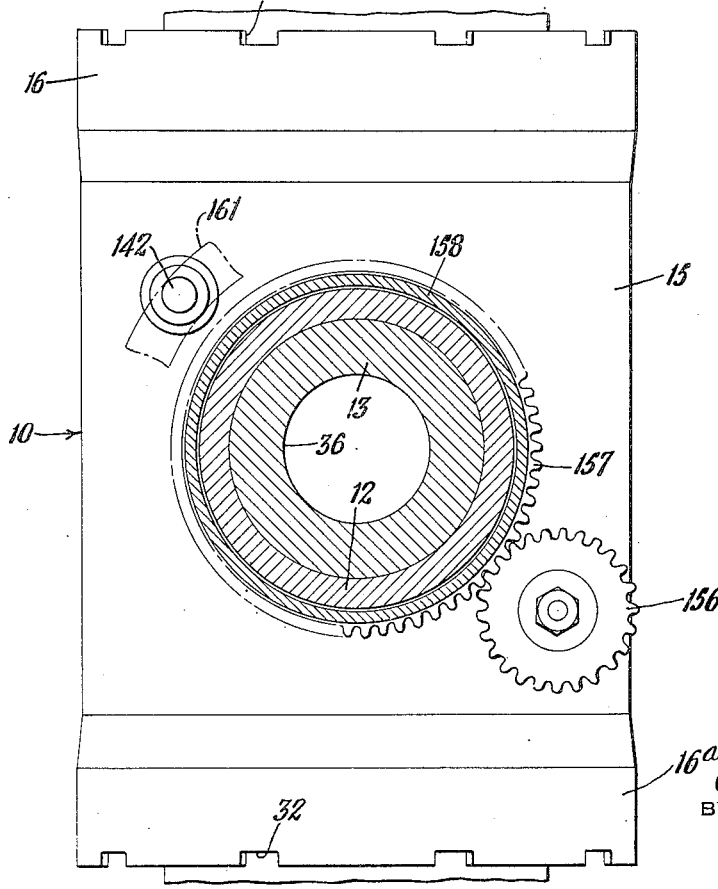
Fig. 4 is a view on line 4—4 of Fig. 1.

As mentioned above, pin projection 78 engages a slot 79 in lever 80 and pin projection 78a engages a corresponding slot 79a in lever 80a. Lever 80 comprises an arm 87 which engages base 19 of the ferrule 17 and is securely attached thereto near the periphery of the ferrule base by means of lag bolts 88; dowels 90 serving to align the lever with the ferrule. Fixed to the arm 87 is an angle arm 91 having in its outwardly extending portion, a slot 79 which accommodates the pin projection 78. With more particular reference to Figs. 2 and 3, it will be observed that when the piston 67 is moved coaxially along the insert, the pin projection also moves coaxially. Its movement is translated to the lever since the pin engages it in the slot 79. However, the other arm 87 of the lever 80, being fixed to the base of the ferrule, the coaxial movement of the piston 67 is translated to rotary motion through the lever. Thus a torque is exerted to rotate the ferrule 17, and hence the propeller blade 11, about its longitudinal axis. Blade 11a is also rotatable about its longitudinal axis in similar fashion by the lever 80a.

A stop arrangement is provided to control the adjustment of the propeller blades within predetermined limits for fine or course pitch position. This arrangement comprises a split clamp ring 92 and a lug 95 secured to the periphery of the hollow arm 16 of the hub. A similar arrangement is provided for each propeller blade.

A typical clamp ring comprises two half sections 96 of similar construction. The outwardly extending lugs 93 and 94 having registering apertures accommodating a bolt 97. Corresponding lugs and bolts on the opposite side from that as viewed in Fig. 2 are provided. Consequently, provision is made by bolts on both sides of the ferrule whereby the distance between the stops 93 and 94 may be adjusted, and the ring may be clamped securely to the ferrule. It will be observed, also, that the spaced stops may be positioned where desired about the periphery of the ferrule.

Thus, when the stops are properly adjusted, the stop 93 will engage lug 95 when the piston 67 is urged to its rearward position on the insert, and stop 93a will engage lug 95a. In this position the propeller blades are adjusted for fine pitch.

On the other hand, when the piston 67 is urged to its forward position the propeller blades are rotated in the opposite direction about their longitudinal axis and stop 94 engages lug 95 and stop 94a engages lug 95a which is the course pitch position.

In some cases, however, it may be desirable to place stops on the insert to cooperate with the piston of the hydraulic motor for the purpose of limiting pitch adjustment.

To actuate the piston 67 there is provided a suitable pump which is preferably of rotary type mounted within the hub. As shown in the drawings, the pump 100 is of the rotary vane type (see Figs. 5 to 7). It comprises two blocks 101 and 102, one of which contains intake port 103, discharge port 104, and pressure adjusting mechanisms 105 and the other, clamped by screws 115 to the first, providing a chamber 106 to accommodate the rotor 107. The pump 100 is shaped to be mounted within the hub without interfering with the operation of the piston 67. It may be secured to the interior surface of the hub by means of screws 108. The rotor 107 is mounted eccentrically to be rotated in the rotor chamber 106. It may have radially disposed slidable vanes 109. As stated before, the hub chamber 85, provides a reservoir for hydraulic fluid; oil having been found preferable for the desired purpose.

When the rotor shaft 110 is rotated in proper direction the pump takes suction through port 103 from the reservoir provided by hub chamber 85. The oil travels through intake conduit 111, then through the rotor chamber 106, and is discharged under pressure through discharge conduit 112 and then through discharge port 104. It will be observed that block 101 is provided with grooves 113 and 114 at the intake and outlet ports of the chamber 106. The pump discharge port 104 is connected by conduit 115b to a routing valve 116 (see Fig. 3) described in further detail hereinafter. To prevent building up of excess pressure on the discharge side of the pump, a relief valve 118 is provided in the block 101. It will be apparent that by suitable selection and adjustment of spring 119, pressure in conduit 112 above a predetermined amount will move the valve plug 118 out from its seat and relieve the fluid pressure through relief vent 121. The valve plug 118 is yieldably held in its seat by the spring 119 which in turn is held by a cap 122, kept in place by a split ring 123. Thus means are provided, when the pump is operating, to maintain a substantially constant fluid pressure on the discharge side of the pump and in the conduit 115b leading to the fluid pressure routing valve 116.

The pump is operated by means of a drive shaft 150 connected to the rotor shaft 110 by a coupling 151. Drive shaft 150 extends through a housing 152 which extends outwardly through the hub barrel wall. The housing may be secured in suitable manner, as by welding. This housing 152 mounts the pump drive shaft 150 for rotation in suitable bearings 153 and 154. Suitable packing 155 is provided to prevent leaking of oil from the hub. Fixed to the outer end of the pump drive shaft 150 is a gear 156 which meshes with a fixed gear 157 which in turn is secured to a non-rotatable hub sleeve 158 attached to a plate 159 securely fastened to the bracket 14, as by means of bolts 160. Thus, rotatable gear 156 and fixed gear 157 provide a sun and planet gear arrangement. Accordingly, when the propeller is rotated, gear 156 fixed to pump drive shaft 150 revolves around the sun gear 157 and also rotates upon its own axis to rotate pump shaft 150; hence, to drive pump 100.

The routing valve 116 provides means whereby the fluid pressure from pump 100 may be routed either to conduit 125, which connects valve 116 with port 86 in boss 61 and hence annular cylindrical space 65, or the fluid pressure may be routed to conduit 126 which connects the valve with port 84 in boss 60 and hence to the annular cylindrical space 64 on the opposite side of annular piston 68.

Valve 116 comprises a cylindrical body portion within which is slidably mounted a pair of spaced pistons 128 and 129 mounted on stem 133; piston 128 cooperates with valve ports 130 and 131. Port 130 connects with conduit 115b from the pump, and valve port 131 connects with conduit 126 which is connected, as mentioned, to the double acting hydraulic motor. Piston 129 cooperates with port 130 and valve port 132, the latter port 132 connects with conduit 125 which is connected, as mentioned, to the other side of the double acting hydraulic motor. Pistons 128 and 129 are fixed to the stem 133, which extends through a housing 134. The housing may be secured to the hub barrel in suitable manner, as by welding. The body of the valve is mounted within the hub barrel. The stem housing 134 extends from the rear of the hub toward the engine and is provided with an annular shoulder 135 providing an abutment for helical spring 136 which normally urges the valve stem 133 outwardly from the hub (that is, toward the engine) to provide communication between ports 130 and 132. When in this position port 131 is vented through the open end 137 of the valve body. The spring 136 also abuts a ring 138, slidable on the housing. The ring 138 is connected to the valve stem 133 by a pin 139 extending through the stem and suitable slots 140 in the housing 134. A packing ring 141 provides a seal to prevent fluid leaking from the hub to the outside. The outer end of the valve stem is provided with a cap member 142. When the valve stem is urged inwardly (that is, away from the engine) against the force of the compression spring 136, port 130 communicates with valve port 131 and port 132 communicates with vent port 143.

To move the valve stem inwardly, there is provided a ring 161, having a contact face 162, mounted on hub sleeve 158 for axial movement. The bore of ring 161 is provided with helical grooves 163, of which there are three equally spaced circumferentially. Keys 164, of which there are three equally spaced circumferentially about the hub sleeve 158, register with the respective grooves. Consequently, upon rotation of ring 161 on the hub sleeve 158, the ring 161 is caused to move axially on the hub. A cord 165 in an external groove 166 and fastened by a bolt 167, may be used to rotate the ring 161 from a remote place; as, for example, from the cockpit of the airplane. When the ring 161 is rotated in proper direction it may be caused to move axially toward the propeller hub and the contact face 162 will then engage the cap member 142 on the stem of routing valve 116, thus to cause pistons 128 and 129 to move inwardly (away from the engine) against the force of spring 136. When the ring 161 is rotated in the opposite direction it will be retracted axially along hub sleeve 158, permitting the spring 136 to move the pistons outwardly (toward the engine) to rear position. The ring may be moved toward the engine sufficiently to disengage the contact face 162 of ring 161 from cap member 142 and then the pistons 128 and 129 take their normal rearward position under the tension of spring 136. To charge hydraulic fluid to the hub chamber 85, charging ports 168, closed by removable screws 169, are provided.

The operation of the device described in the foregoing is as follows: It may be assumed that the propeller assembly has been mounted on the engine as shown in the drawings. It may also be assumed that the hub barrel chamber is charged with a suitable oil of lubricating character. Also, it will have been observed that the parts have been sealed with packing material where needed and the parts otherwise joined in such fashion as to prevent oil from leaking from the propeller hub.

The propeller blades 11 and 11a are adjusted to the desired fine pitch position and the clamping rings 92 and 92a are clamped to the ferrules in such manner that at fine pitch position stop 93 engages lug 95 and stop 93a engages lug 95a. When in this position levers 80 and 80a are in such position that the piston 67 will be in its rearward position. When the piston levers and stops are in this position the propeller is adjusted for fine pitch position. At the same time routing valve 116 is adjusted so that when ring 161 is in its forward position the valve stem 133 is in its forward position. Assuming that the propeller is rotating with the engine drive shaft, planet gear 156 is rotating about its axis, while it revolves around sun gear 157, to operate pump 100. The operation of the pump sets up fluid pressure in conduit 115b. By reason of pistons 128 and 129 of valve 116 being in their forward position, the fluid pressure is routed through conduit 126 to exert fluid pressure on ring piston 68 to maintain the piston in its rearward position which corresponds to the fine pitch adjustment of the propeller blades. Fluid pressure on the opposite side of ring piston 68, that is, in annular chamber 65 is vented through conduit 125 back through the routing valve through port 132 and vent 143.

If it is desired to adjust the propeller blades to course pitch position, contact ring 161 is rotated in proper direction to cause it to be retracted axially toward the engine out of engagement with cap member 142 on the stem of valve 116. This permits spring 136 to move the valve stem 133 and thus pistons 128 and 129 to their rearward position. When the valve is in this position fluid pressure in conduit 115b from pump 100, which is in constant operation when the propeller is rotating, is then routed to conduit 125. This causes the fluid pressure to be exerted in annular chamber 65 of the hydraulic motor against ring piston 68, which drives the piston 67 to its forward position. Fluid pressure in chamber 64 of the hydraulic motor is then vented through conduit 126 through valve ports 131 and open end 137 of the valve body. When piston 67 is thus urged to its forward position, levers 80 and 80a rotate their respective ferrules 17 and 17a until stops 94 and 94a engage their respective lugs 95 and 95a. In this position the blades are in their course pitch position. It will be understood, of course, that the stops 94 and 94a of clamps 92 and 92a will have been adjusted to correspond with the predetermined course pitch. It will also be observed that the distance between stops 93 and 94 and between 93a and 94a may be adjusted as desired for the limits of fine pitch and course pitch positions.

If it is desired to change the propeller from course to fine pitch, it will be apparent from the foregoing description that all that is necessary is to rotate ring 161 to move it axially and forwardly from the engine. This again causes the contact face 162 of ring 161 to contact the cap member 142 which urges the valve stem 133 to forward position. When the valve stem is in its forward position fluid pressure is routed through valve 116 through conduit 126 to move the piston 67 to its rearward position which corresponds to fine pitch position of the propeller blades, as described.

From the foregoing it will be seen that the invention provides a controllable pitch propeller which is readily adjustable for operation in two positions, namely, fine or course pitch. The operating mechanism, comprising fluid pump, control valve, conduits, and hydraulic motor, as well as the hydraulic fluid are all within the hub and therefore it may be said that the operating mechanism is self-contained. While the invention is adapted for large or small propellers, it lends itself particularly to the construction of smaller propellers. Inasmuch as the operating parts are self-contained within the hub, no fluid connections are required for connection with outside pumps. Consequently, the propeller may be removed from the engine and replaced with dispatch and facility.

Although the invention has been illustrated and described with particular reference to the embodiment shown in the drawings it will be understood that various changes, substitutions, modifications or omissions of parts may be made by those skilled in the art without departing from the invention comprehended by the following claims.

What is claimed is:

1. For an aircraft propeller having variable pitch blades an hydraulic motor mountable within the propeller hub to rotate said blades about their axes, which motor comprises an insert having a bore adapted to drivingly connect the propeller to an aircraft engine crankshaft, spaced annular bosses having smooth peripheral surfaces, said bosses being secured to and extending around and outwardly from the exterior surface of said insert and serving with the exterior surface of said insert to provide an annular cylindrical space to accommodate an annular piston, an annular ring piston mounted on said insert and slidable axially along said insert between said bosses and having a sleeve slidable with said piston shaped to enclose the annular space between said bosses, the inner surface of said sleeve engaging the outer peripheral surfaces of said bosses and slidable thereon and the inner surface of said ring and piston engaging said insert ports leading into the chamber defined by said piston sleeve, bosses and insert through which hydraulic fluid may be forced under pressure to actuate said piston and means on said piston for connections to translate axial movement of the piston into torque to rotate said blades to change their pitch.

2. In an airplane propeller having variable pitch propeller blades, a hub having arms for mounting the roots of the variable pitch propeller blades, an insert of generally cylindrical shape having a hollow interior adapted to drivingly connect the propeller to an engine drive shaft, spaced annular bosses extending around the exterior surface of said insert and serving with the exterior surface of said insert to provide an annular cylindrical space to accommodate an annular piston, each of said bosses being secured to the insert at its inner edge and having a smooth surface at its outer exposed peripheral edge, an annular piston mounted on said insert and slidable axially along said insert between said bosses and shaped to enclose the annular space between said bosses, said piston comprising a sleeve portion and a piston ring portion extending inwardly from the sleeve portion, the inner surface of said piston ring portion engaging the exterior surface of said insert between the bosses and the inner surface of said sleeve portion being smooth and engaging the outer peripheral smooth surfaces of said bosses, means to exert fluid pressure on said piston to cause said piston to move in a coaxial direction, and means connecting with said piston and the roots of said blades causing change of pitch of said blades in response to movement of said piston.

3. A variable pitch propeller assembly which comprises a hollow hub having radially extending hollow arms, means for mounting a propeller blade in each of said arms for rotation about its longitudinal axis to provide for change of the pitch of such blades when mounted in said arms, a hollow insert mounted in said hub having a bore to receive the drive shaft of an engine, spaced annular bosses around the exterior of said insert, an hydraulic motor including an annular piston in contact with the exterior surface of said insert slidable coaxially back and forth between said bosses, a rotary pump within said hub, said hollow hub providing a reservoir for fluid to be circulated by said pump, means for causing said pump to operate when said hub is rotated about the axis of said bore, thereby to cause said pump to exert fluid pressure on said piston, a valve connected by conduits to said pump and motor having adjustable means to cause the fluid pressure from said pump to operate said piston coaxially in one direction or the other, means within said hub adapted to connect said piston and blades when mounted in said arms to change the pitch of such blades in response to movement of said piston, and a member adapted to be mounted independently of said hub and movable coaxially in the direction of the axis of said bore to make contact with said valve adjusting means, said valve adjusting means being operative to cause the said fluid to move said piston in one direction when said adjusting means is in operative contact with said member and in the opposite direction when not in contact with said member.

4. A variable pitch propeller assembly which comprises a hollow hub having radially extending hollow arms; means for mounting a propeller blade in each of said arms for rotation of the blade about its longitudinal axis to provide for change of the pitch of said blades; a hollow insert mounted in said hub to receive the drive shaft of an engine; an hydraulic motor within said hub; a fluid rotary pump within said hub having a shaft extending to the outside of said hub, said hollow hub providing a reservoir for fluid to be circulated by said pump; means including a stationary gear and a rotating gear meshing therewith on the outside of said hub causing said pump to operate when said hub is rotated by the engine shaft, thereby to cause said pump to exert fluid pressure on said motor; a valve within said hub connected by conduits within said hub to said pump and to said motor, said valve having adjustable means to cause the fluid pressure from said pump to operate said motor in one direction or the other, said valve having a stem extending to the outside of said hub; means including levers within said hub for connecting said motor and blades to change the pitch of said blades in response to operation of said motor; and a contact member adapted to be mounted independently of said hub and movable coaxially along said drive shaft to make and break contact with said valve stem to move said valve adjusting means, said valve adjusting means being movable to cause the said fluid to operate said motor in one direction when said valve stem is in operative contact with said member and in the opposite direction when not in contact with said member.

5. In an aircraft propeller having variable pitch blades, a hub having two radially extending arms each for mounting the root end of one of said blades for rotation about its long axis, said hub serving as a reservoir for hydraulic fluid, an insert mounted in said hub, said insert being of generally cylindrical shape and having a hollow interior adapted to drivingly connect the propeller to an engine drive shaft, a pair of spaced annular bosses extending around the exterior surface of said insert and serving with the exterior surface of said insert to provide an annular cylindrical space to accommodate an annular piston, each boss being secured at its inner edge to said insert and extending outwardly therefrom and having a smooth peripheral surface at its outer exposed edge, an annular piston constructed of two half complementary sections mounted on said insert and slidable axially along said insert, said piston comprising a sleeve and a piston ring portion extending inwardly from the interior surface of the sleeve and engaging the exterior surface of said insert between said bosses, said sleeve being shaped to enclose the annular space between said bosses and having a smooth interior surface at each end, the interior surface at one end engaging the exterior smooth surface of one of said bosses and at the other end engaging the exterior smooth surface of the other of said bosses, means to exert fluid pressure on either side of said piston to cause said piston to move coaxially along said insert in one direction or the other, a lever mounted on each of said blades, a pin on each of said half sections, one pin connecting with one of said levers and the other pin connecting with the other of said levers, each of said levers producing a torque to rotate its connected blade upon axial movement of said piston.

6. A variable pitch propeller assembly which comprises a hollow hub having radially extending hollow arms, means for mounting a propeller blade in each of said arms for rotation about its longitudinal axis to provide for change of the pitch of such blades when mounted in said arms, a hollow insert mounted in said hub having a bore to receive the drive shaft of an engine, an hydraulic motor within said hub, a fluid pump within said hub, said hollow hub providing a reservoir for fluid to be circulated by said pump, means for causing said pump to operate when said hub is rotated by such engine shaft when mounted in said bore, thereby to cause said pump to exert fluid pressure on said motor, a valve connected by conduits to said pump and motor having adjustable means to cause the fluid pressure from said pump to operate said motor in one direction or the other, means within said hub for connecting said motor and blades when mounted in said arms to change the pitch of said blades in response to operation of said motor, a hub sleeve adapted to be mounted independently of said propeller hub, a rotatable contact ring adapted to be mounted on said hub sleeve and movable coaxially along said sleeve to make contact with said valve adjusting means, said valve adjusting means being movable to cause the said fluid to operate said motor in one direction when said adjusting means is in operative contact with said ring and in the opposite direction when not in contact with said ring.

7. A hub assembly for a variable pitch propeller for airplanes which comprises a hollow hub providing a reservoir for hydraulic fluid and having radially extending arms, each arm being adapted to support a propeller blade for angular displacement about its longitudinal axis, whereby the pitch of blades mounted in said arms may be changed, a rotary pump mounted within said hub for pumping hydraulic fluid contained in said reservoir, a pitch adjusting hydraulic motor within said hub operative in response to fluid pressure exerted by said pump, pitch adjusting levers within said hub connecting said motor and blades and operated by said motor to angularly displace said blades and adjust the pitch thereof, a hollow insert mounted in said hub to receive the drive shaft of an engine for driving connection thereto, means including a planet gear connected to the driving shaft of said rotary pump and a sun gear mounted independently of said hub to drive said pump in response to rotation of said hub, a valve mounted on said hub, conduit connections between said valve and pump and between said valve and motor, fluid flow adjusting means in said valve adjustable to cause fluid from said pump to operate said motor in one direction or the other and a member mounted independently of said hub operable manually to adjust the direction of fluid flow by make and break contact between said fluid flow adjusting means and member; said rotary pump, motor, pitch adjusting levers and fluid all being self-contained within the interior of said hub.

CHARLES I. LATHREM.

REFERENCES CITED

The following references are of record in the file of this patent:

UNITED STATES PATENTS

| Number | Name | Date |
|---|---|---|
| 853,999 | Schmid | May 21, 1907 |
| 1,723,617 | Hele-Shaw et al. | Aug. 6, 1929 |
| 2,205,625 | Mader | June 25, 1940 |
| 2,257,126 | Rindfleisch | Sept. 30, 1941 |
| 2,307,102 | Blanchard | Jan. 5, 1943 |
| 2,319,592 | Fielder | May 18, 1943 |
| 2,404,290 | Hoover | July 16, 1946 |

FOREIGN PATENTS

| Number | Country | Date |
|---|---|---|
| 464,203 | Great Britain | Apr. 12, 1937 |
| 480,747 | Great Britain | Feb. 25, 1938 |
| 493,416 | Great Britain | Oct. 7, 1938 |
| 635,992 | Germany | Sept. 30, 1936 |
| 703,319 | Germany | Mar. 6, 1941 |